Patented July 25, 1939

2,167,272

UNITED STATES PATENT OFFICE 2,167,272

PROCESS OF PRODUCING CRYSTALLINE ERGOSTEROL

Walter A. Carlson, Minneapolis, Minn., assignor to General Mills, Inc., a corporation of Delaware No Drawing. Application July 9, 1938, Serial No. 218,478

8 Claims. (Cl. 260—397)

The present invention relates to the preparation of ergosterol and more particularly to a process of producing large crystals of this compound.

The primary object of my invention is to produce ergosterol crystals of a form and size that is resistant to fracture and also has little tendency to pack, so that mechanical handling and conveyance is greatly simplified.

Another object of my invention is to produce comparatively large, ergosterol crystals and thus avoid loss in handling due to ergosterol dust being carried off by air currents and adhering to the walls of containers.

A further object of my invention is to produce strong ergosterol crystals in commercial quantities and by a process that is both comparatively simple and inexpensive.

These and other objects and advantages of my invention will be more readily apparent from a consideration of the following detailed specification and appended claims.

Ergosterol is a naturally occurring sterol which is isomeric with vitamin D and differs therefrom in molecular arrangement. Methods for its preparation and purification are already known to the art. By suitable treatment, it assumes a vitamin D potency.

Hitherto, purity has been the only prime requirement in ergosterol, and crystallizations have been carried out to that end without regard to the resulting crystal form. In the process of purification by recrystallization, small crystals are considered desirable since there is less occlusion of impurities. The crystalline erogsterol thus produced has been in the form of flat plates or fine needles, depending upon the procedure and solvents used. The plates build up into an overlapping structure that is difficult to handle or transfer by mechanical means, such as a conveyor screw. The needles of ergosterol are of a type in which one axis is very long in proportion to the other two so that a quantity of it will very quickly form an interlocking mass that resists any attempt to remove a fraction of it. In addition, small particles of ergosterol regardless of form tend to collect in corners and crevices and also to rise into the air as a dust while being handled.

The present invention is based upon the discovery that the above-mentioned difficulties may be obviated and that large, pure crystals of ergosterol may be produced by a process which comprises dissolving, .2% to 3%, by volume, of water in a suitable organic solvent, adding about 5%, by weight, of commercial ergosterol to the previously formed solution, and then heating the solution to its boiling point, then slowly cooling the solution to room or atmospheric temperature, and then filtering the solution to separate crystals of ergosterol from the mother liquor. If desired, the crystals of ergosterol may then be washed with an organic solvent, such as ethyl acetate, to remove adsorbed impurities therefrom.

Ergosterol crystals, produced by the above-described process, have a ratio of axial lengths which can be expressed by small, whole numbers.

The following specific example will serve to illustrate and explain my invention. 100 grams of anhydrous ergosterol was dissolved in 2000 cubic centimeters of boiling technical ethyl acetate (containing about 12% to 15% ethyl alcohol) in which there was also dissolved 15 cubic centimeters of water. This mixture was placed in a container so insulated that by natural cooling the temperature drops gradually to room temperature in the course of 48 hours. The solution was then removed and filtered to separate the crystals of ergosterol from the mother liquor. The crystals were washed with a portion of cold ethyl acetate (about 200 cubic centimeters) and air dried for one day. Due to the presence of water in the solvent the crystals usually have a ratio of axial lengths in the range of, roughly, 1:1:2 to 1:1:5.

Ergosterol crystallizes with one molecule of water per molecule of ergosterol. The 15 cubic centimeters of water used in the above example is about 3.3 times the amount required to furnish the water of crystallization taken up by 100 grams of ergosterol. If the amount of water used is reduced to only 2 times the amount required for water of crystallization, control of the crystallization becomes difficult and the batch often consists of a mixture of crystalline plates together with the desired type of crystals. As the amount of water in the organic solvent decreases, the percentage of satisfactory crystals decreases. Water that is carried into solution by ergosterol to be recrystallized applies toward this minimum critical amount of water required.

By applying the above process and proportions to a larger batch, for example, 5000 grams of ergosterol, control of cooling is more easily accomplished, and no more than 5% to 10% of ergosterol crystals will pass through a 40 mesh sieve, with the average size passing a 10 mesh sieve and retained on a 20 mesh sieve.

It is necessary to use a solvent that will dissolve the minimum amount of water required. For example, the solubility of water in benzene is very low, so that crystallization of ergosterol from benzene saturated with water will at best yield only a few scattered crystals of ergosterol of the special type described above.

There is a practical limit to the maximum amount of water used. As the water percentage is increased, a point is reached at which the solubility begins to decrease, the decrease continuing upon the addition of further quantities of water. For example, at 23° C. the solubility of ergosterol is at a maximum if there is about 0.2% water present in the ethyl acetate. At 0.5% to 0.6% water, the solubility is down to the same value as with no water present, and with increasing amounts of water, the solubility is still lower. Therefore, the objection to the use of too great a quantity of water is based on the effect on the solubility although the desired type of crystals will continue to be formed. Successful crystallizations have been carried out with 3% of water in the solvent.

The ratios of water to ergosterol are given on the basis of dry or anhydrous ergosterol. If ergosterol, as usual, enters the process containing water, the water contained in the ergosterol must be considered as contributing to the water content of the solvent. Therefore, 100 grams of crystalline hydrated ergosterol is actually 95.6 grams of ergosterol plus 4.4 grams of water. Thus, in the specific example given above, it would be possible to use 105 grams of hydrated ergosterol, 2000 cubic centimeters of technical ethyl acetate, and 10 cubic centimeters of water.

The rate of cooling the hot solution comprising an organic solvent, water and ergosterol is of importance as the cooling must be at a slow rate in order to obtain large crystals of ergosterol. The size of the ergosterol crystals is an inverse function of the rate of cooling.

In addition to utilizing technical ethyl acetate as an organic solvent, I may employ pure ethyl acetate, pure ethyl acetate containing ethyl alcohol, or a mixture of benzene and ethyl alcohol, in the proportion of four parts of benzene to one part of ethyl alcohol.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

I claim as my invention:

1. A process of producing large crystals of ergosterol which comprises dissolving .2% to 3%, by volume, of water in an organic solvent, selected from a group consisting of ethyl acetate, ethyl acetate containing ethyl alcohol, and a mixture of benzene and ethyl alcohol, adding about 5%, by weight, of ergosterol to the previously formed solution, and then heating the solution to its boiling point, then slowly cooling the solution to room temperature, and then filtering the solution to separate the crystals of ergosterol from the mother liquor.

2. A process of producing large crystals of ergosterol which comprises dissolving .2% to 3%, by volume, of water in an organic solvent selected from a group consisting of ethyl acetate, ethyl acetate containing ethyl alcohol, and a mixture of benzene and ethyl alcohol, adding about 5%, by weight, of ergosterol to the previously formed solution and then heating the solution to its boiling point, then slowly cooling the solution to room temperature, then filtering the solution to separate the crystals of ergosterol from the mother liquor, and finally washing the crystals of ergosterol with an organic solvent to remove adsorbed impurities therefrom.

3. A process of producing large crystals of ergosterol which comprises dissolving .2% to 3%, by volume, of water in ethyl acetate, adding about 5%, by weight, of ergosterol to the previously formed solution, and then heating the solution to its boiling point, then slowly cooling the solution to room temperature, and then filtering the solution to separate the crystals of ergosterol from the mother liquor.

4. A process of producing large crystals of ergosterol which comprises dissolving .2% to 3%, by volume, of water in an organic solvent selected from a group consisting of ethyl acetate, ethyl acetate containing ethyl alcohol, and a mixture of benzene and ethyl alcohol, adding about 5%, by weight, of ergosterol to the previously formed solution, and then heating the solution to its boiling point, then slowly cooling the solution to room temperature, then filtering the solution to separate the crystals of ergosterol from the mother liquor, and finally washing the crystals of ergosterol with ethyl acetate to remove adsorbed impurities therefrom.

5. In the process of recrystallizing ergosterol from an organic solvent, selected from a group consisting of ethyl acetate, ethyl acetate containing ethyl alcohol, and a mixture of benzene and ethyl alcohol, the step which comprises dissolving water in one of the aforementioned organic solvents, in the proportion of from 2 to 30 parts by volume of water per 1000 parts of organic solvent.

6. In the process of recrystallizing ergosterol from solution, the step which comprises adding to the solution an excess of water over that required for water of hydration.

7. In the process of recrystallizing ergosterol from solution, the step which comprises including in the solution more than two molecules of water per molecule of ergosterol.

8. A process of crystallization of ergosterol which comprises slowly cooling a solution containing more than two molecules of water per molecule of ergosterol.

WALTER A. CARLSON.